June 16, 1936.                R. C. HOLTON                    2,044,302
                            CONNECTING DEVICE
                            Filed Sept. 19, 1934
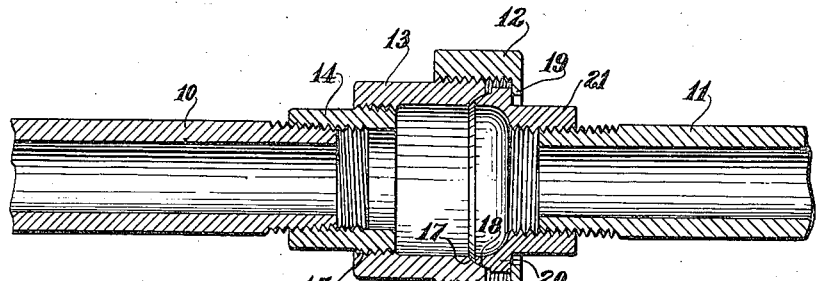
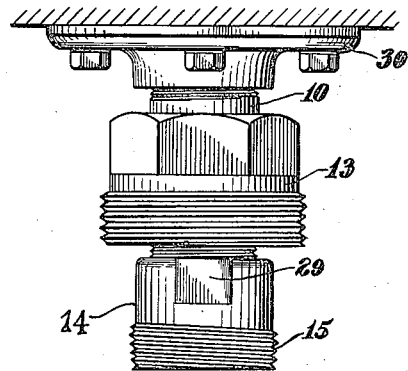
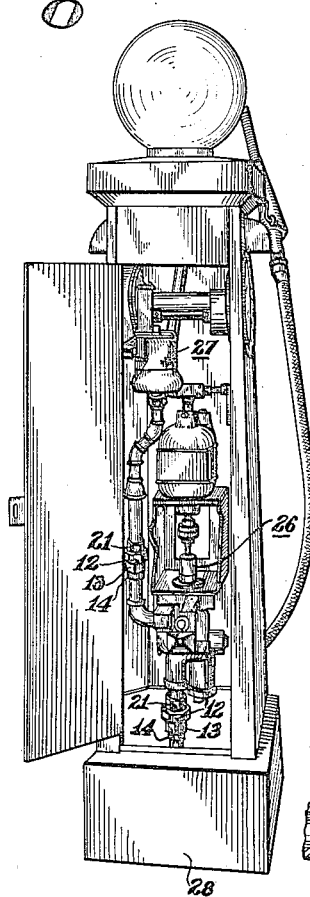
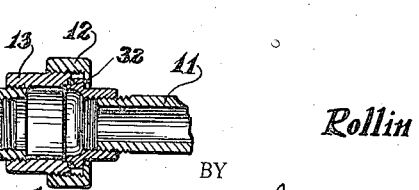
INVENTOR.
Rollin C. Holton.
BY
George V. Woodling
ATTORNEY.

Patented June 16, 1936

2,044,302

UNITED STATES PATENT OFFICE 2,044,302

CONNECTING DEVICE

Rollin C. Holton, Cleveland, Ohio

Application September 19, 1934, Serial No. 744,702

2 Claims. (Cl. 285—13)

My invention relates, in general, to connecting devices and more particularly to unions for connected pipes, or the like.

An object of my invention is the provision of a union for pipes or the like, wherein, when the union is disassembled, there is sufficient space between the ends of the connected pipes to allow them to be disengaged without disaligning the pipes.

Another object of my invention is the provision of a union, wherein the union permits removal of the connected pipes, or of any device to which the connected pipes may be connected, without disturbing or disaligning the connected pipes or reshifting or relocating the device, in order to obtain sufficient space between the ends of the connected pipes to allow their removal.

Another object of my invention is the provision of a union having an extension portion which, when the extension portion is disassembled, gives sufficient space between the ends of the connected pipes to allow the pipes to be removed, without disaligning the connected pipes.

Other objects, and a clearer understanding of my invention may be had by referring to the following description, taken in connection with the accompanying drawing in which:

Figure 1 represents a cross sectional view of a union embodying the features of my invention.

Figure 2 is a view of a union embodying the features of my invention, the union being illustrated in its disassembled position.

Figure 3 is an elevated view of a gasoline pump in which my unions are employed, and Figure 4 is a cross sectional view of a modified form of my union wherein a gasket is employed, instead of direct contact engaging surfaces.

With reference to Figure 1 of the drawing, my union is adapted to connect the two pipes 10 and 11. As illustrated, the union comprises a sleeve 14, an extension 13, a tightening collar 12, and a flanged sleeve 21. The sleeve 14 may be provided with a standard pipe female thread to engage the standard male thread provided on the end of the pipe 10. The threads are so arranged that the sleeve 14 is tightened upon the pipe 10 by turning it to the right, or in a clockwise direction as viewed from the right-hand side of the union. As shown, the outer surface of the sleeve 14 may be provided with a male pipe thread 15 adapted to threadedly engage the female pipe thread provided internally of the extension 13. These threads are so arranged that the extension 13 is tightened when it is turned to the left, or in a counter-clockwise direction, as viewed from the right-hand side of the union. The male pipe threads 15 provided on the outside of the sleeve 14 have a negative tapper; in that, beginning at the right-hand end of the sleeve 14 they have a decreasing diameter as they recede towards the central portion of the sleeve 14.

As shown, the flanged sleeve 21 is provided with an external flange 20 which is engaged by the internal flange 19 provided on the tightening collar 12. Therefore, by tightening the collar 12, the left-hand end 18 of the flanged sleeve 21 firmly engages a right-hand end 17 of the extension 13. These contacting surfaces 17 and 18 are machined or ground to match each other, so that when they are drawn tightly together by the tightening collar 12, there is a good tight seal established to prevent the fluid or gas which flows through the pipe from escaping.

In explaining the function of my union, let it be assumed that the pipe 10 of Figure 2 is to be disconnected from the flange 30. In this case, the tightening collar 12 is first unscrewed from the extension 13 and then backed off over the flanged sleeve 21, around the pipe 11, which is connected to the flange 31. The extension 13 is then turned to the right as viewed from the right-hand side of the union, and unscrewed from the sleeve 14, after which it is backed off the sleeve 14, around the pipe 10. The parts of the union are so proportioned that in the view shown in Figure 2, there is sufficient space between the end of the sleeve 14 and the end 18 of the flanged sleeve 21, to allow the pipe 10 to be threadably disengaged from the flange 30. In other words, the space between the end of the sleeve 14 and the end 18 of the flanged sleeve 21 is greater than the depth that the pipe 10 is screwed into the flange 30. It is pointed out, however, that it is not necessary to remove the pipe 10 first, but that the pipe 11 may be removed first, as well as the pipe 10.

It is noted that, while tightening the extension 13 on the sleeve 14, since it is turned to the left when tightening, there is a tendency to unscrew the sleeve 14 from the pipe 10. Therefore, as illustrated, in Figure 2, the extension 14 is provided with two opposite flat portions 29, whereby, during the assembling of the union, it may be held by a wrench while the extension 13 is being screwed on the sleeve 14.

There are many applications for my invention, one of which is shown with reference to the gasoline pump of Figure 3, which comprises in general a base 28, a pumping unit 26, and a meter 27. It is noted that one of my unions is mounted in the pipes leading to the pumping unit 26 from the tank buried in the ground, and another union is mounted in the pipes which interconnects the pump unit 26 to the meter 27. In maintaining gasoline pumps, it frequently becomes necessary to remove the entire pumping unit 26 for repairs. In doing this, it is only necessary, with my invention, to disconnect the two unions and then remove the pumping unit from the casing. This is made possible, because there is sufficient space between the sleeve 14 and the flanged sleeve 21 to allow the removal of the pumping unit 26, without disaligning the connected pipes. In those cases wherein my union is not employed, but where the standard union is employed, there is a great deal of difficulty encountered in removing the pumping unit 26, as the disconnected pipes will not clear each other. Therefore, it becomes necessary to unfasten the base 28 from its foundation, and jack-up the base 28, which gives a clearance between the disconnected pipes leading to the pumping unit 26. However, before the pumping unit 26 can be removed it becomes necessary to unloosen the pumping unit 26 and allow it to drop down sufficiently so that the disconnected pipes that lead to the meter 27 may not interfere with the removal of the pumping unit 26. This is a difficult job to do because there is usually a rather small place in which to work, and also the pumping unit 26 is quite heavy to handle conveniently all of which, of course, is obviated by utilizing unions embodying the features of my invention.

In Figure 4, I illustrate a modified view of my union in that, I embody a gasket 32 instead of the ground or machined contacting engaging surfaces 17 and 18, as shown in Figure 1. The construction of the remaining parts of the union are the same as those shown and described in the preferred form of my invention. While I have shown my invention in connection with rigid pipes, it is to be understood, however, that my invention may be used for the joining of flexible tubing, and metallic hose of various kinds, as well as rigid pipes.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A device for connecting two aligned members having their adjacent ends spaced apart and provided with threads comprising, in combination, a sleeve having on one end, male threads and on the other end threads adapted to threadably engage the threads on the end of one of the aligned members, a flanged sleeve having threads adapted to threadably engage the threads on the end of the other aligned member, said flanged sleeve having an external flanged portion provided with a rearward surface and a forward sealing surface, the arrangement of the said sleeve and the said flanged sleeve being such that when they are both threadably engaged to their respective aligned members, there is sufficient space between their adjacent ends to allow either the said sleeve or the said flanged sleeve to be threadably disengaged from its aligned member without disaligning the aligned members, an extension for telescoping the said sleeve and arranged to extend to and engage the flanged sleeve, said extension having female threads adapted to threadably engage the male threads of the said sleeve and having a complementary sealing surface adapted to cooperate with the sealing surface of the flanged sleeve, and fastening means for securing the sealing surface of the flanged sleeve and the complementary sealing surface of the extension together to form a good connection.

2. A device for connecting two aligned members having their adjacent ends spaced apart and provided with threads comprising, in combination, a sleeve having on one end male threads and on the other end threads adapted to threadably engage the threads on the end of one of the aligned members, a flanged sleeve having threads adapted to threadably engage the threads on the end of the other aligned member, said flanged sleeve having an external flanged portion provided with a rearward engaging shoulder and a forward sealing surface, the arrangement of the said sleeve and the said flanged sleeve being such that when they are both threadably engaged to their respective aligned members, there is sufficient space between their adjacent ends to allow either the said sleeve or the said flanged sleeve to be threadably disengaged from its aligned member without disaligning the aligned members, an extension having male and female threads and adapted to telescope the said sleeve and extend to and engage the flanged sleeve, said female threads of the extension being adapted to threadably engage the male threads of the said sleeve, and arranged with such taper that the threads tighten as the extension moves longitudinally toward the flanged sleeve, and said male threads of the extension being adapted to align themselves with the periphery of the said external flanged portion of the flanged sleeve, the end of said extension being provided with a complementary sealing surface adapted to cooperate with the sealing surface of the flanged sleeve, and a tightening collar having an internal flange adapted to engage the rearward engaging shoulder of the external flange portion and having female threads adapted to threadably engage the male threads on the extension for drawing the sealing surface of the flanged sleeve and the sealing surface of the extension towards each other and thereby securing a tight connection between the flanged sleeve and the extension.

ROLLIN C. HOLTON.